UNITED STATES PATENT OFFICE.

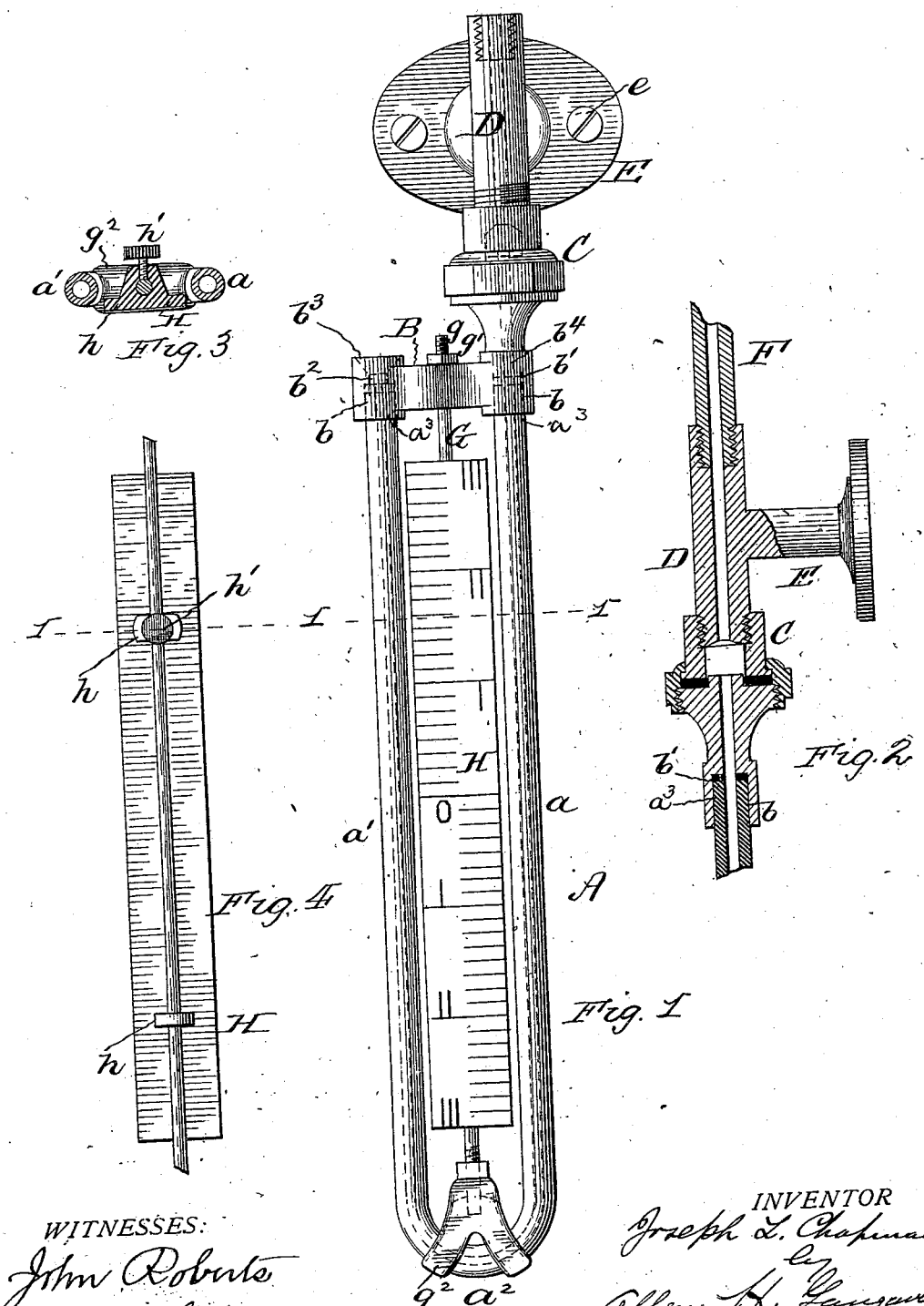

JOSEPH L. CHAPMAN, OF HADDONFIELD, NEW JERSEY.

PRESSURE-GAGE.

SPECIFICATION forming part of Letters Patent No. 355,381, dated January 4, 1887.

Application filed March 29, 1886. Serial No. 196,873. (No model.)

*To all whom it may concern:*

Be it known that I, JOSEPH L. CHAPMAN, of Haddonfield, in the county of Camden and State of New Jersey, have invented a new and valuable Improvement in Pressure-Gages; and I do hereby declare that the following is a full, clear, and exact description of the construction and operation of the same, reference being had to the annexed drawings, making a part of this specification, and to the letters and figures of reference marked thereon.

Figure 1 is an elevation of a pressure-gage embodying my invention. Fig. 2 is a detail section of the upper part of one of the legs of the gage and its bracket for fastening the gage to the wall or other fixture, showing also the steam-pipe connection therewith. Fig. 3 is a section on lines 1 1, Figs. 3 and 4; and Fig. 4 is a rear view of adjusting indicator, scale, or register for the gage.

My invention has relation to pressure-gages for indicating steam or other pressure; and it has for its object simplicity of construction, whereby the gage can readily and securely be attached to a wall or fixture, and the scale or indicator adjusted to the level of the mercury or other fluid in the gage tubes or legs forming the same.

My invention accordingly consists of the combination, construction, and arrangement of parts, as hereinafter described and claimed.

In the drawings, A represents the glass or other suitable tube for the gage, composed of two legs, $a\ a'$, joined or bent at their bottom, as indicated at $a^2$. The upper ends, $a^3$, of these legs are open, as more plainly indicated in Fig. 2, and fit into smooth sockets or openings $b$ in a bracket, B, suitable flexible or elastic washers, $b'$, being interposed between the upper ends of the legs and their bearings in said sockets. Through the socket $b$ of bracket B, into which the leg $a'$ fits or enters, an opening, $b^2$, is formed or made, having an upper outwardly-flaring configuration, as indicated at $b^3$, to form a funnel for pouring mercury or other fluid into the legs $a\ a'$ forming the gage-tube.

Through the socket $b'$ of bracket B, into which the leg $a$ enters, is continued an opening, $b^4$, and upon this end of the bracket is fitted or swiveled a coupling, C, connected or screwed to a pipe, D, having a laterally or other projecting bracket, E, with screw-holes $e$, for fastening the gage firmly and securely to a wall or fixture. Into it pipe D is screwed, or it is connected with a steam-pipe, F, (see Fig. 2,) from a boiler or other fixture. (Not shown in the drawings.)

Through the middle of bracket B passes a rod, G, having a threaded upper end, $g$, and adjusting-nut $g'$, and its lower end screws into a yoke or metal support, $g^2$, suitably attached or clamped upon the bend $a^2$ of the gage-tube A, for fastening or holding the gage-tube A to bracket B. By adjusting the nut $g'$ the clamping-pressure between the ends of the tube and the bracket may be varied as desired. This rod G also supports a scale indicator or register, H, having the zero-point at its middle, and above and below which lines or marks are made indicating degrees, as shown. This plate or scale H is provided with lugs $h$ (see Figs. 3 and 4) on its rear side, through which the rod G passes, and one of these lugs has a set-screw, $h'$, or spring, for fastening the scale to the rod when suitably adjusted or otherwise.

The operation is as follows: The gage being suitably affixed in position and its end or pipe D connected to the steam-pipe F, mercury or other suitable fluid is poured through opening $b^3$ into the gage-tube until it rises to the height of the zero-point. No undue care need be taken in pouring the mercury or fluid into the gage-tube, because if a more or less quantity of mercury or fluid is poured and its level is either above or below the zero-point, it does not matter, as the scale or indicator can be adjusted on rod G until zero-point corresponds with the level of the mercury or fluid. In this manner the zero-point of the indicator or scale is adjusted to the level of the mercury or fluid in the gage-tubes, and not the level of the mercury or fluid to the zero-point of the scale, as has heretofore been the case.

The steam or other pressure entering leg $a$ and acting on the mercury or fluid is indicated upon the scale by the rise and fall of the mercury or fluid above and below its level or the zero-point of said scale.

The employment of coupling C permits the gage to be turned or rotated, so as to be easily inspected.

What I claim is—

1. In a pressure-gage, the combination of bracket B, tubes $a\ a'$, yoke $g^2$, and rod G, for clamping together said bracket and tubes, substantially as shown and described.

2. In a pressure-gage, the combination of bracket B, tubes $a\ a'$, yoke $g^2$, adjustable rod G, for clamping together said bracket and tubes, and indicator or scale H, and adjustable on rod G, substantially as shown and described.

3. A pressure-gage composed of bent or U-shaped tubes $a\ a'$, bracket B, having socketed openings for the reception of the open or upper ends of tubes $a\ a'$, coupling C, pipe D, having lateral bracket E, yoke $g^2$, adjustable rod G, for clamping together said bracket B and tubes, and scale or indicator H, adjustable on rod G, substantially as shown and described.

4. In a pressure-gage, the bracket B, having pouring-opening $b$, swiveled coupling C, and pipe D, having bracket E, substantially as shown and described.

In testimony that I claim the above I have hereunto subscribed my name in the presence of two witnesses.

JOSEPH L. CHAPMAN.

Witnesses:
ALLEN H. GANGEWER,
DeLANCEY G. WALKER.